(12) United States Patent
Park et al.

(10) Patent No.: US 6,766,146 B1
(45) Date of Patent: Jul. 20, 2004

(54) CHANNEL COMMUNICATION DEVICE AND METHOD FOR MOBILE COMMUNICATION SYSTEM USING TRANSMISSION ANTENNA DIVERSITY

(75) Inventors: Jin-Soo Park, Seoul (KR); Jae-Heung Yeom, Seoul (KR); Jae-Min Ahn, Seoul (KR); Hyeon-Woo Lee, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/378,372

(22) Filed: Aug. 20, 1999

(30) Foreign Application Priority Data

Aug. 20, 1998 (KR) ........................................ 1998-34187

(51) Int. Cl.[7] .................................................. H04Q 7/38
(52) U.S. Cl. ....................... 455/69; 455/101; 455/562.1
(58) Field of Search .......................... 455/69, 101, 561, 455/562.1, 67.11, 67.17, 422.1; 370/337, 347, 436, 442, 478, 479, 498, 537, 540; 375/347

(56) References Cited

U.S. PATENT DOCUMENTS

| | | | | |
|---|---|---|---|---|
| 5,097,484 A | * | 3/1992 | Akaiwa | ...................... 455/101 |
| 6,131,016 A | * | 10/2000 | Greenstein et al. | ........... 455/69 |
| 6,212,242 B1 | * | 4/2001 | Smith et al. | ................. 455/101 |
| 6,600,934 B1 | * | 7/2003 | Yun et al. | ...................... 455/69 |

* cited by examiner

Primary Examiner—Lester G. Kincaid
(74) Attorney, Agent, or Firm—Dilworth & Barrese, LLP (57) ABSTRACT

A channel communication device and method for a mobile communication system using transmission antenna diversity. A base station alternatively transmits signals on a common channel via at least two antennas at first and second intervals. A mobile station estimates a time relationship between the alternatively switched common channel and a user channel and measures the power of the received signals corresponding to the first and second intervals. The mobile station selects an antenna having stronger power by comparing the power of the signal corresponding to the first interval with the power of the signal corresponding to the second interval, and informs the base station of the selected antenna. The base station transmits a dedicated channel via the selected antenna.

29 Claims, 7 Drawing Sheets

CHANNEL COMMUNICATION DEVICE AND METHOD FOR MOBILE COMMUNICATION SYSTEM USING TRANSMISSION ANTENNA DIVERSITY

PRIORITY

This application claims priority to an application entitled "Channel Communication Device and Method for Mobile Communication System Using Transmission Antenna Diversity" filed in the Korean Industrial Property Office on Aug. 20, 1998 and assigned Serial No. 98-34187, the contents of which are hereby incorporated by reference.

BACKGROUND OF THE INVENTION

1. Field of the Invention

The present invention relates generally to a mobile communication system, and in particular, to a channel communication device and method using transmission antenna diversity.

2. Description of the Related Art

CDMA (Code Division Multiple Access) mobile communication systems have developed a voice-based mobile communication standard called IMT-2000 which is capable of transmitting data at a high rate as well as voice. The IMT-2000 standard provides services such as high-quality voice, moving pictures and Internet search. In a CDMA mobile communication system, a communication path between a mobile station and a base station is classified into a forward link, where data is transmitted from the base station to the mobile station, and a reverse link, where data is transmitted from the mobile station to the base station.

The capacity of the forward link requires much higher gain as the traffic increases. If the mobile station moves slowly, transmission antenna diversity on the forward link has a gain of about 1–7 dB as compared with non-transmission antenna diversity. This means that the capacity of the system can be increased two or three times. The performance of the system is greatly improved when the receiver of the mobile station cannot obtain sufficient path diversity and when the moving velocity of the mobile station is low.

Transmission antenna diversity indicates that a path over which a signal transmitted from the base station reaches the mobile station is multiplexed to raise the reliability of a received signal with respect to the same transmission signal power of the base station. In this context, the path means not only a spatial path, but a physical path which can transmit a signal from a transmitting side to a receiving side. For instance, the path can be the direction of a transmission antenna, polarization of a transmission signal, position of a transmission antenna, different carrier wave frequencies on a frequency axis, and different transmission time points on a time axis. As an example of transmission diversity, there is TSTD (Time-Switched Transmission Diversity) in which the base station has a plurality of antennas and the signal to be output through a transmitter is selected by a switch, thereby multiplexing a path reaching the mobile station from the base station.

Figure 1:
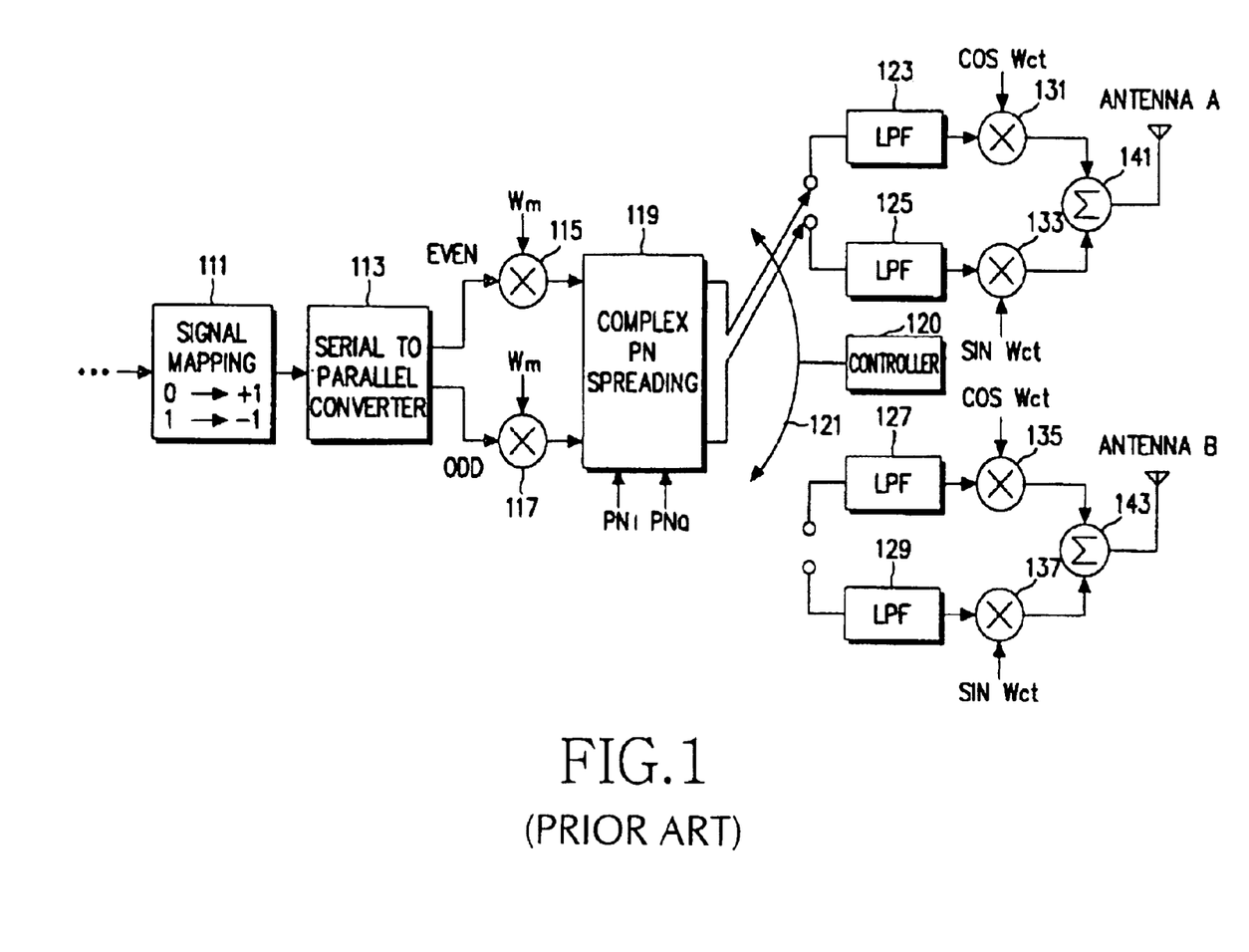
FIG. 1 is a block diagram of a prior art TSTD transmitter.

Referring to FIG. 1, which illustrates a conventional TSTD transmitter, a signal mapping circuit 111 receives a combined signal of encoded user data and long codes, and maps the level of the received signal. That is, the signal mapping circuit 111 converts an input signal "0" into "+1" and "1" into "−1". A serial-to-parallel converter 113 converts a serial signal output from the signal mapping circuit 111 into a parallel signal and separately outputs odd signals and even signals. Multipliers 115 and 117 respectively multiply the even signals and odd signals output from the serial-to-parallel converter 113 by an orthogonal code $W_m$. The multipliers 115 and 117 are to modulate (or spread) a desired user signal to the orthogonal code. A Walsh code may be used for the orthogonal code. A complex PN (Pseudo Noise) spreader 119 spreads the orthogonally modulated signals output from the multipliers 115 and 117 by using PN sequences $PN_I$ and $PN_Q$. A controller 120 generates a switching control signal for distributing a transmission signal to a plurality of antennas by using TSTD.

A switch 121 switched by the switching control signal provided from the controller 120 has a common terminal connected to I-channel and Q-channel spread signal output terminals of the complex PN spreader 119, a first output terminal connected to LPFs (Low-Pass Filters) 123 and 125, and a second output terminal connected to LPFs 127 and 129. The switch 121 switches the spread signal output from the complex PN spreader 119 to either one of two pairs of the LPFs 123 and 125 and the LPFs 127 and 129 by the switching control signal.

The LPFs 123 and 125 low-pass filter the I-channel and Q-channel PN spread signals output through the switch 121. Multipliers 131 and 133 respectively multiply the outputs of the LPFs 123 and 125 by carrier wave frequency signals to output up-converted frequency signals. An adder 141 adds signals output from the multipliers 131 and 133 to each other. The added signal is transmitted via transmission antenna A.

The LPFs 127 and 129 low-pass filter the I-channel and Q-channel PN spread signals output through the switch 121. Multipliers 135 and 137 respectively multiply the outputs of the LPFs 127 and 129 by carrier wave frequency signals to output up-converted frequency signals. An adder 143 adds signals output from the multipliers 135 and 137 to each other. The added signal is transmitted via transmission antenna B.

In addition to TSTD, there is STD (Selective Transmission Diversity) in which the mobile station measures the power strength of pilots received from two transmission antennas, compares its relative rate with a threshold, and then periodically transmits an antenna selection signal to the base station. The base station then transmits data via the one antenna with better reception, as selected by the mobile station.

Figure 2:
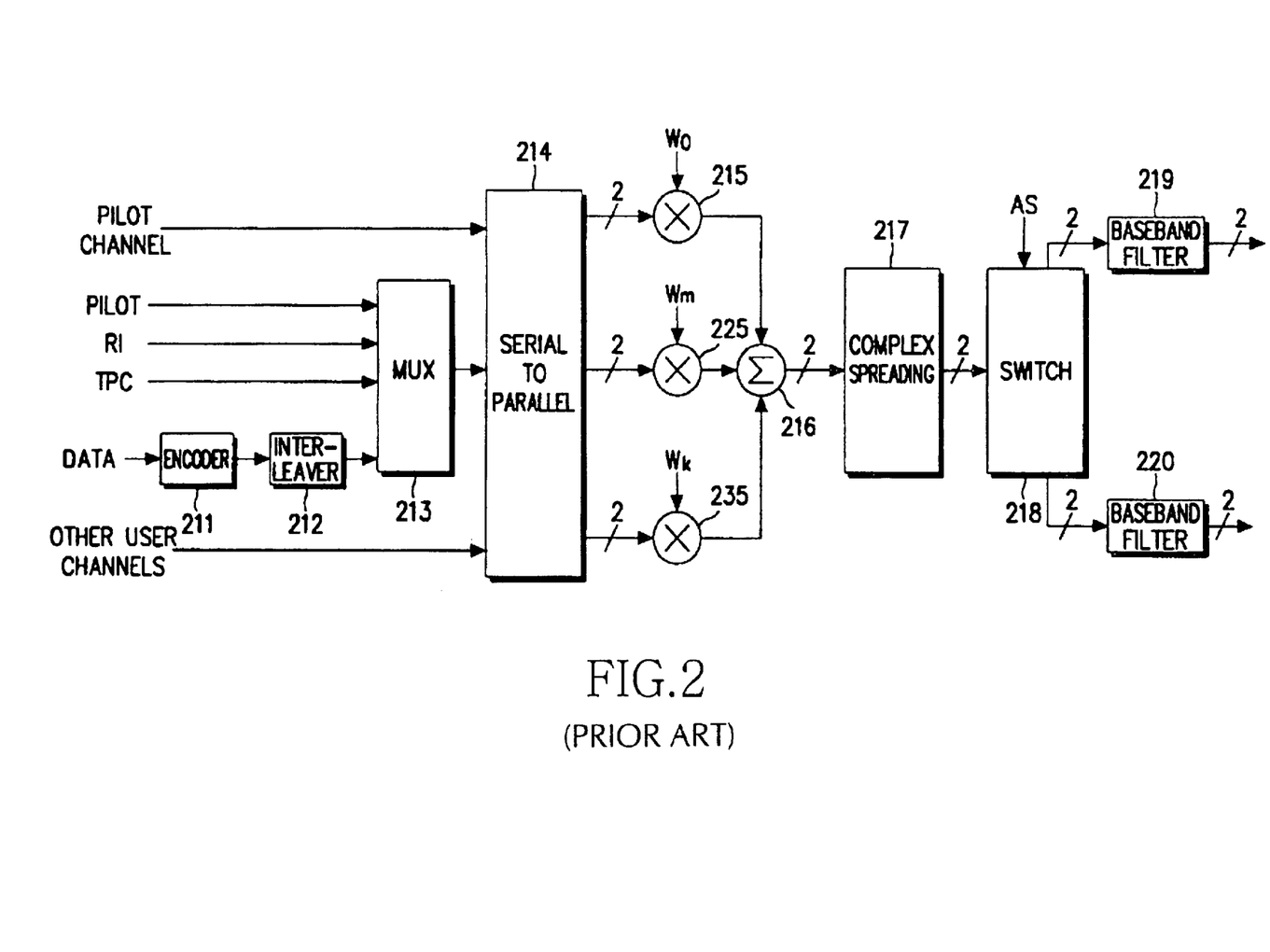
FIG. 2 is a block diagram of a prior art STD transmitter.

Referring to FIG. 2, which illustrates a conventional STD transmitter, a channel encoder 211 encodes data to be transmitted. A convolution encoder or a turbo encoder may be used for the channel encoder 211. An interleaver 212 interleaves symbols output from the channel encoder 211 to prevent a burst error. A multiplexer (MUX) 213 multiplexes a pilot symbol, a transmission power control bit (TPC), rate information (RI), and data interleaved by the interleaver 102. A serial-to-parallel converter 214 maps an input channel signal and converts the mapped signal into a parallel signal. For instance, the serial-to-parallel converter 214 converts an input signal "0" into "+1" and "1" into "−1" and separately outputs in parallel odd signals and even signals. Multipliers 215, 225 and 235 respectively multiply the parallel channel signals output from the serial-to-parallel converter 214 by corresponding orthogonal codes. An adder 216 adds the orthogonally modulated signals output from the multipliers 215, 225 and 235 to each other. A complex spreader 217 spreads the output of the adder 216 by using PN sequences $PN_I$ and $PN_Q$. A switch 218 switches the output of the complex spreader 217 by an antenna selection signal (AS) provided by a controller. The antenna selection signal is determined by an antenna switching command from the mobile station. Baseband filters 219 and 220 low-pass filter the I-channel and Q-channel PN spread signals switched by the switch 218.

Figure 3:
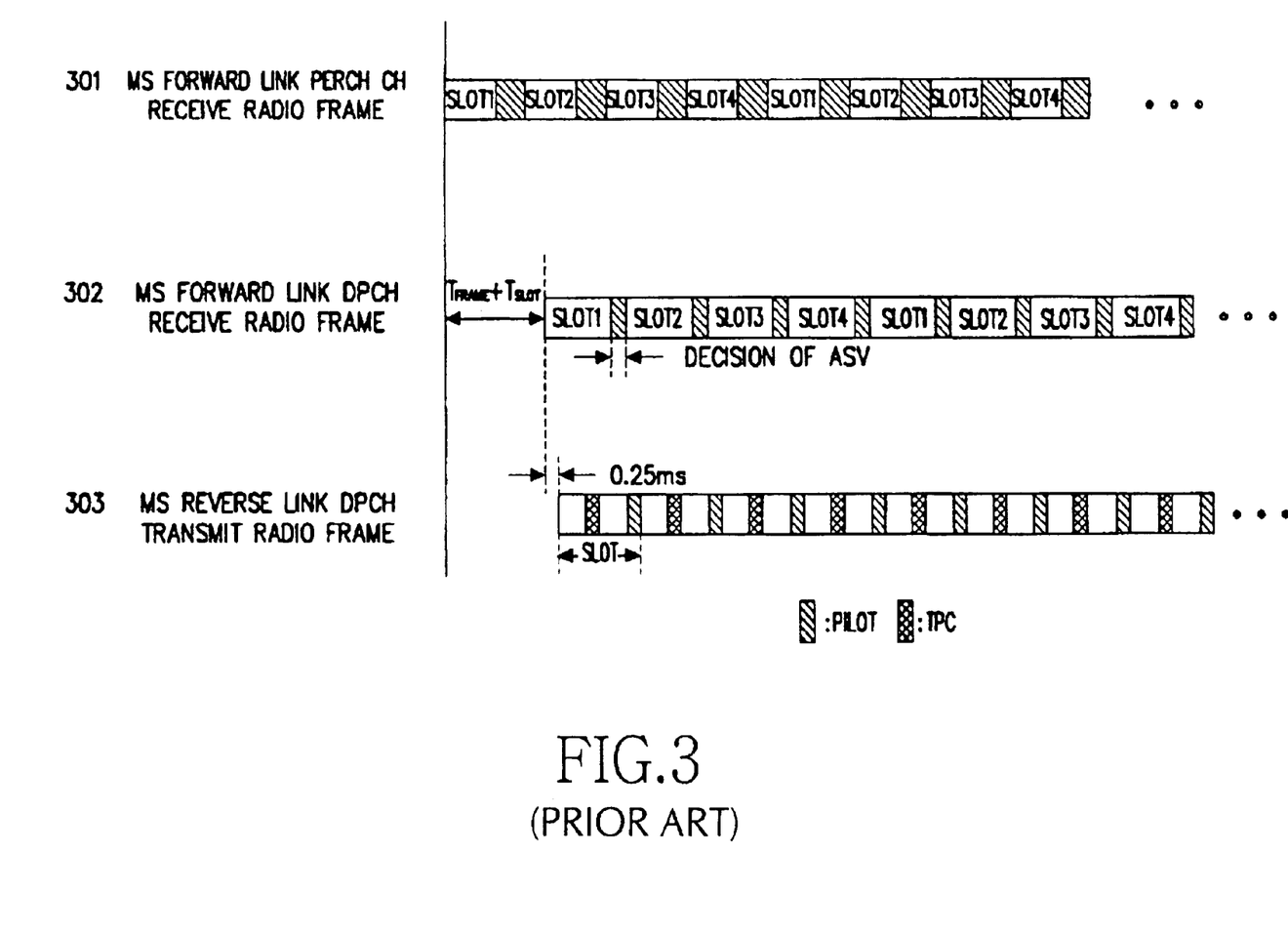
FIG. 3 is a diagram illustrating the configurations of signals exchanged between a base station and a mobile station in a prior art asynchronous mobile communication system which does not use transmission antenna diversity.

FIG. 3 is a diagram illustrating the structure of signals exchanged between the base station and a mobile station in a conventional asynchronous mobile communication system that does not use transmission antenna diversity. Reference numeral 301 denotes a forward perch channel received by the mobile station (MS). The perch channel includes a search code for time synchronization. The search code is used to determine to which cell group a mobile station belongs in order to acquire slot sync and frame sync. That is, the mobile station acquires frame sync and slot sync using the search code of the perch channel, and obtains the dedicated physical channel information using a time offset provided from the base station. The mobile station measures the phase and power of the pilot symbols to estimate a channel condition. Reference numeral 302 indicates a forward dedicated physical channel (DPCH) received by the mobile station. The dedicated physical channel is a communication channel (or dedicated control channel) assigned exclusively to a subscriber. There is a time offset $T_{Frame}+T_{Slot}$ between the perch channel and dedicated physical channel. Here, $T_{Frame}$ indicates an offset of a slot unit, and $T_{Slot}$ an offset of a symbol unit. Reference numeral 303 denotes a reverse dedicated physical channel transmitted by the mobile station. In the reverse dedicated physical channel, a pilot symbol and a TPC are time-multiplexed at each slot. There is an offset of 0.25 ms between the forward and reverse dedicated physical channels.

Figure 4:
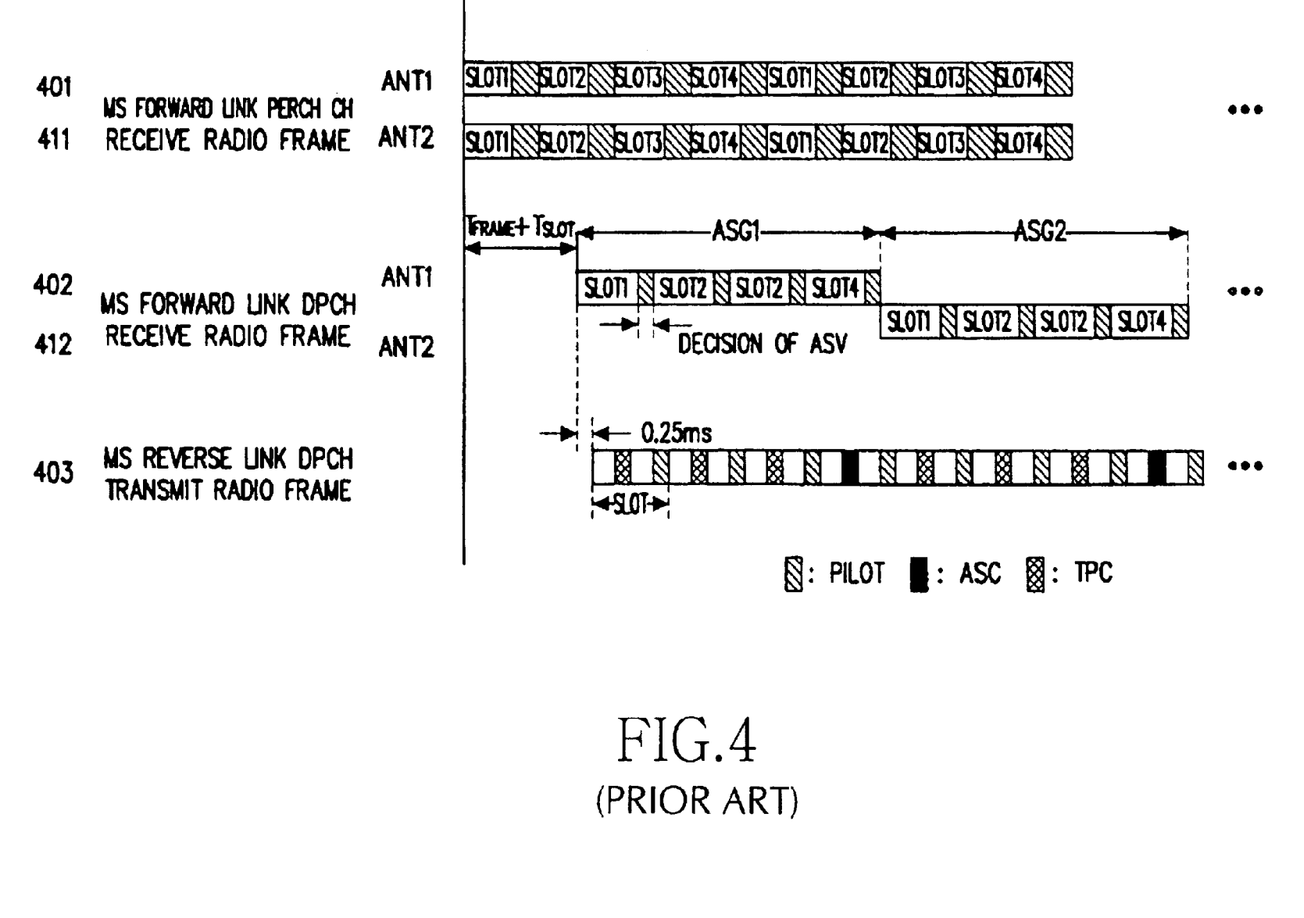
FIG. 4 is a diagram illustrating the configurations of signals exchanged between a base station and a mobile station when a dedicated physical channel is transmitted using STD in a prior art asynchronous mobile communication system.

FIG. 4 is a diagram illustrating configurations of signals exchanged between a base station and a mobile station when the base station having multiple antennas transmits a dedicated physical channel using STD in a conventional asynchronous mobile communication system. Reference numeral 401 indicates a forward perch channel transmitted by antenna 1 and received by the mobile station, and reference numeral 411 a forward perch channel transmitted by antenna 2 and received by the mobile station. The perch channel includes a search code for time synchronization. The oblique lines represent pilot symbols. The mobile station measures the phase and power of the pilot symbols to determine which one of the two antennas has little channel distortion. The mobile station selects an antenna for transmitting the dedicated physical channel and informs the base station of the selected antenna. Reference numeral 402 indicates a forward dedicated physical channel transmitted via antenna 1 to the mobile station, and reference numeral 412 indicates a forward dedicated physical channel transmitted via antenna 2 to the mobile station. A time offset $T_{Frame}+T_{Slot}$ exists between the perch channel and dedicated physical channel. Reference numeral 403 indicates a reverse dedicated physical channel transmitted by the mobile station. In the reverse dedicated physical channel, a pilot symbol and a TPC are time-multiplexed at each slot. Moreover, in the reverse dedicated physical channel, the TPC is punctured at the fourth slot and an antenna switching command (ASC) is inserted into the punctured position. The mobile station transmits the dedicated physical channel in which the ASCs are inserted to the base station. The base station then transmits the dedicated physical channel via a corresponding antenna selected by the ASC. In FIG. 4, the antenna is selected every 4 slots.

Consequently, in conventional STD, the perch channels in which the sync channels are time-multiplexed are consecutively transmitted by using different codes according to the antennas so that the mobile stations can distinguish between a plurality of antenna signals transmitted from the base station. Thus, since the perch channel is transmitted via two antennas, transmission power is increased. Therefore, the capacity of the base station is decreased, and the system is complicated since different pilots are used according to the antennas.

SUMMARY OF THE INVENTION

An object of the present invention is to provide a communication device and method for effectively transmitting a common channel (a perch channel and a common physical channel) used to select a transmission antenna by a base station, when the base station having a plurality of antennas transmits a dedicated channel by using STD in a CDMA communication system.

Another object of the present invention is to provide a communication device and method for controlling antenna switching in consideration of a time offset between channels in an asynchronous mobile communication system.

To achieve these and other objects of the present invention, there is provided a channel communication method for a mobile communication system using transmission antenna diversity, including the steps of: alternatively transmitting, at a base station, signals on a common channel via at least two antennas at first and second intervals; measuring, at a mobile station, the power of the received signals corresponding to the first and second intervals; selecting, at the mobile station, an antenna having stronger power by comparing the power of the signal corresponding to the first interval with the power of the signal corresponding to the second interval, and informing the base station of the selected antenna; and transmitting, at the base station, a dedicated channel via the selected antenna.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Figure 5:
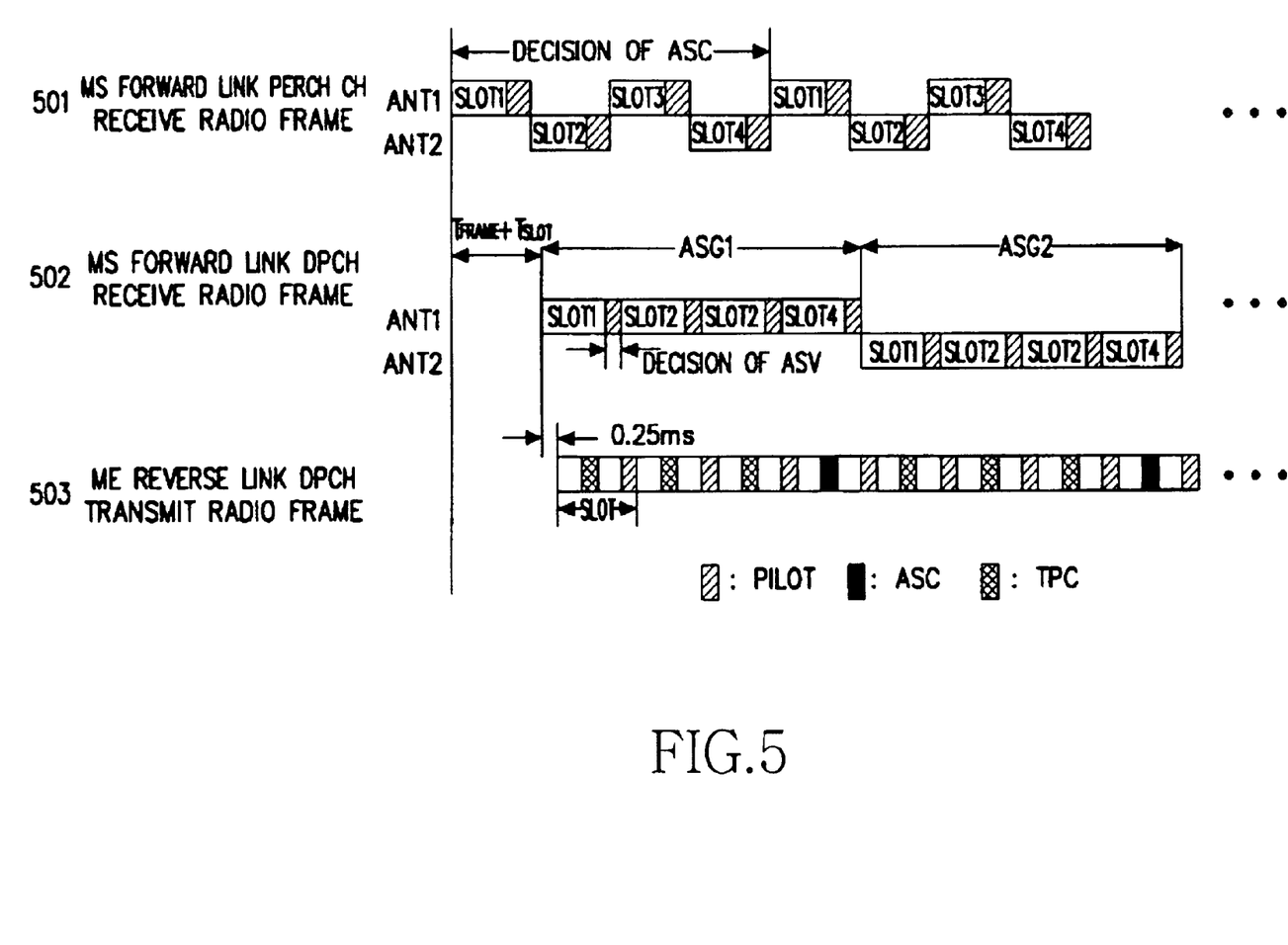
FIG. 5 is a diagram illustrating the configurations of signals exchanged between a base station and a mobile station when a dedicated physical channel is transmitted using STD in an asynchronous mobile communication system according to the present invention.

FIG. 5 illustrates configurations of signals exchanged between a base station and a mobile station when the base station transmits a dedicated physical channel using STD in an asynchronous mobile communication system according to the present invention.

Referring to FIG. 5, reference numeral 501 designates a forward perch channel transmitted via antenna 1 to the mobile station. The perch channel includes a search code for time synchronization. Oblique lines denote pilot symbols. Hereinafter, the perch channel will be referred to as a common channel. The base station switches a plurality of antennas to alternatively transmit the common channel in a slot unit. That is, the base station transmits the common channel via antenna 1 at slot 0, slot 1, slot 3, slot 5, . . . , and via antenna 2 at slot 2, slot 4, slot 6. The mobile station receives the common channel during 4 slots, adds the power of the common channel at odd-numbered two slots to each other, and adds the power of the common channel at even-numbered two slots to each other to decide which antenna transmits a signal with a better channel condition. The base station selects an antenna according to an antenna switching command (ASC) provided by the mobile station and transmits a dedicated physical channel via the selected antenna. Reference numeral 502 indicates a forward dedicated physical channel received by the mobile station. In the drawing (FIG. 5), the mobile station receives the dedicated physical channel via antenna 1 during 4 slots and via antenna 2 during the next 4 slots. If the ASC designates the antenna that is currently communicating, the base station transmits the dedicated physical channel via the current communicating antenna without a switching operation. Reference numeral 503 denotes a reverse dedicated physical channel transmitted by the mobile station. A TCP is punctured at the fourth slot and the ASC is inserted into the punctured position. The mobile station transmits the dedicated physical channel in which the ASCs are inserted to the base station. The base station then transmits the dedicated physical channel via a corresponding antenna according to the ASC. In this preferred embodiment, the antenna is selected every 4 slots.

As described above, the base station transmits the common channel by periodically switching antenna 1 and antenna 2, and transmits the dedicated physical channel by switching the antennas every 4 slots according to the ASC provided by the mobile station.

In the asynchronous mobile communication system, there is a time offset $T_{Frame}+T_{Slot}$ between the common channel (perch channel, sync channel) and the dedicated physical channel (DPCH), as illustrated in FIG. 5. Here, $T_{Frame}$ indicates an offset of a slot unit, and $T_{Slot}$ an offset of a symbol unit. In the following description, it is assumed that 16 slots each having the length of 625 µsec constitute one frame of 10 ms. It is also assumed that antenna switching for transmitting the perch channel is periodically performed every one slot and antenna switching for transmitting the dedicated physical channel is performed every four slots according to an antenna switching command (ASC) provided by the mobile station. The mobile station generates the ASC by measuring the power of the received common channel so that the base station can select an antenna for transmitting the dedicated physical channel. The power of the common channel is measured throughout a plurality of slots in order to determine a channel condition for each antenna. In the preferred embodiment of the present invention, the power of the common channel is measured throughout four slots, i. e., two slots per antenna.

The power measuring time precedes the dedicated physical channel switching time. That is, a 4-slot power measuring duration on the common channel for deciding the ASC precedes an antenna switching group (ASG) duration on the dedicated physical channel by one slot. When measuring the power of the common channel during 4 slots, the mobile station compares the power of the common channel at odd two slots (slot1 and slot3) with the power of the common channel at even two slots (slot2 and slot4) to determine an antenna selection number (ASN). The ASC is determined in consideration of the ASN and a time offset between channels. The reason why the time offset is considered in determining the ASC is to control antenna switching even without an indication for distinguishing between antennas.

Figure 6:
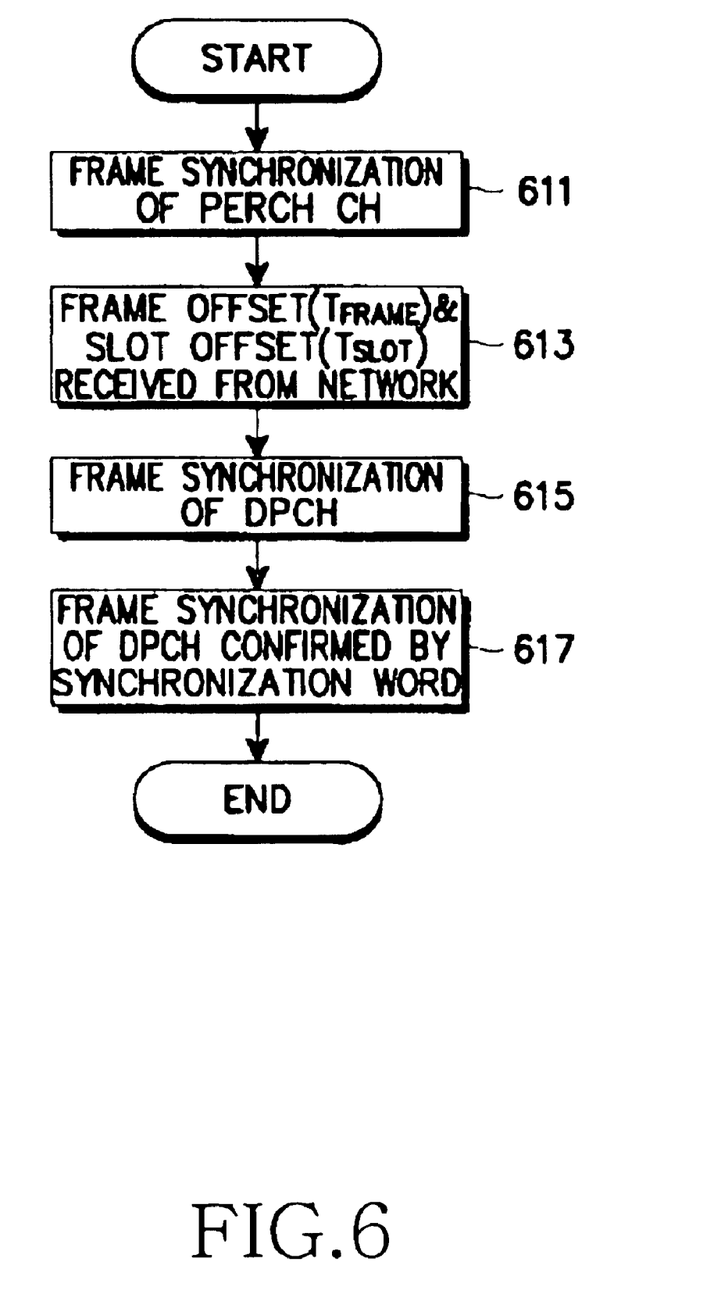
FIG. 6 is a flow chart of the procedure of a mobile station for acquiring the frame sync of a dedicated physical channel in an asynchronous mobile communication system according to the present invention.

The process of determining the ASC will now be described. Before receiving the dedicated physical channel, the mobile station acquires the frame sync of the perch channel and dedicated physical channel according to the procedure shown in FIG. 6. Referring to FIG. 6, the mobile station acquires the frame sync of the common channel at step 611. The mobile station then calculates the time offset $T_{Frame}+T_{Slot}$ between the common channel and dedicated physical channel at step 613. The mobile station receives the dedicated physical channel by using time offset information. The mobile station acquires the frame sync of the dedicated physical channel at step 615. The mobile station then confirms the frame sync of the dedicated physical channel by a sync word at step 617.

Figure 7:
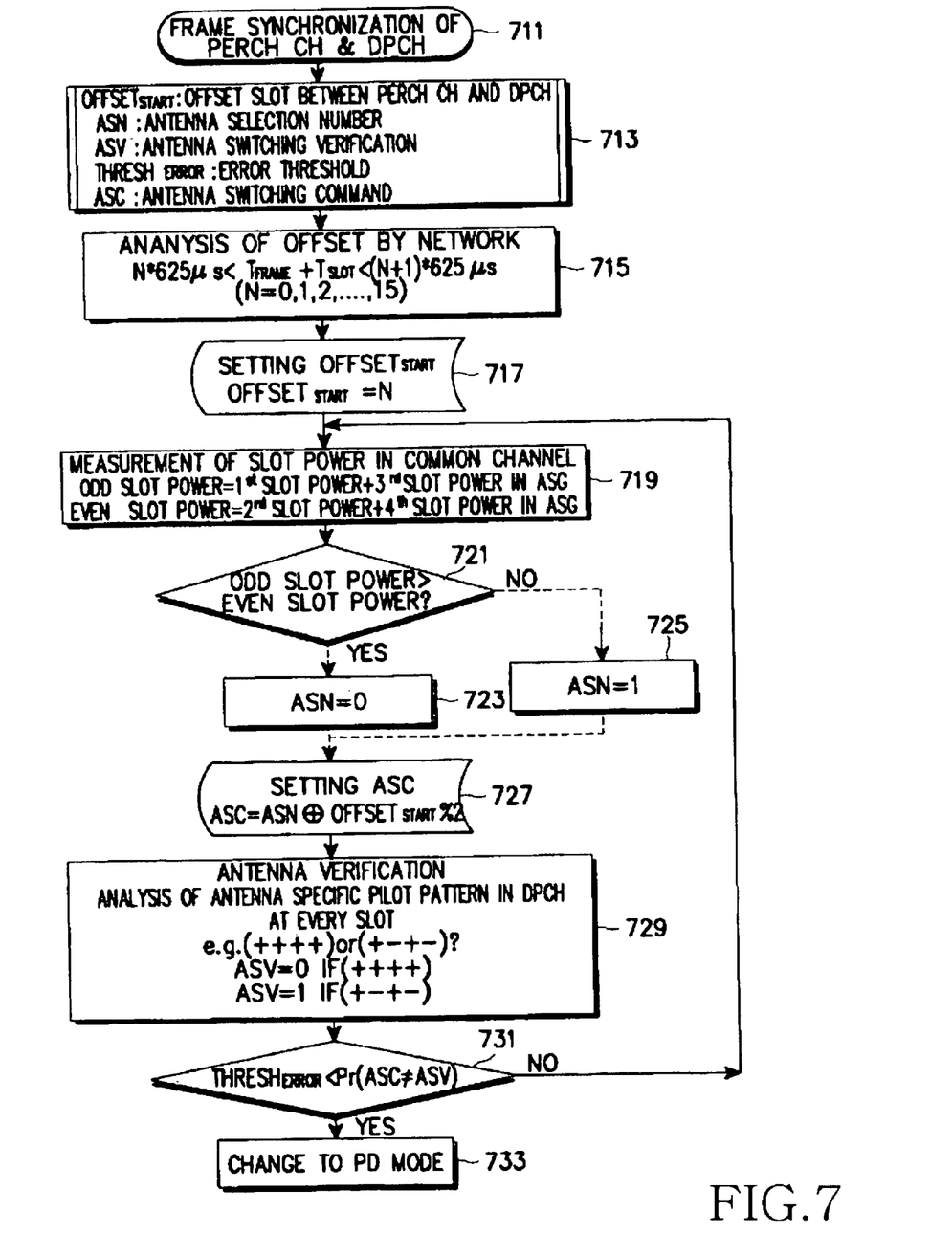
FIG. 7 is a flow chart of the procedure of a mobile station for deciding a transmission antenna of a base station in an asynchronous mobile communication system according to the present invention.

Thus, if the mobile station acquires the frame sync and is aware of the time offset $T_{Frame}+T_{Slot}$ between the common channel and the dedicated physical channel, it determines the ASC by the procedure illustrated in FIG. 7.

Referring to FIG. 7, parameters defined at step 713 are as follows.

A start offset (offset$_{start}$) indicates a slot number of the common channel which corresponds to the start slot of the dedicated physical channel.

An antenna selection number (ASN) is obtained by comparing the power at even slots with the power at odd slots, during 4 slots. For instance, if the power at odd slots is greater than the power at even slots, the ASN is set to "0", and if not, the ASN is set to "1".

An antenna switching verification value (ASV) is a parameter for verifying whether the dedicated physical channel is transmitted via an antenna selected by the mobile station.

A threshold (Thresh$_{Error}$) indicates a threshold for an error generated when the dedicated physical channel is received via an antenna which is not selected by the mobile station.

An antenna switching command (ASC) indicates a command for selecting a base station transmission antenna obtained by the procedure illustrated in FIG. 7. The ASC is inserted into a specific position of a TPC of the reverse dedicated physical channel.

The mobile station calculates N (=0, 1, 2, . . . , or 15) satisfying Equation 1 at step 715.

$$N \times 625\ \mu sec \leq T_{Frame} + T_{Slot} < (N+1) \times 625\ \mu sec \quad \text{Equation 1:}$$

The mobile station sets offset$_{start}$ to N calculated by Equation 1 at step 717. The mobile station measures the power of the common channel at step 719. Odd-slot power is obtained by adding the power at the first slot to the power at the third slot. Even-slot power is obtained by adding the power at the second slot to the power at the fourth slot.

The mobile station compares the odd-slot power with the even-slot power at step 721. If the odd-slot power is greater than the even-slot power, the ASN is set to "0" at step 723, and if not, the ASN is set to "1" at step 725. The mobile station generates the ASC by Equation 2:

$$\text{ASC} = \text{ASN} \oplus (\text{offset}_{start}\ \%\ 2) \quad \text{Equation 2:}$$

where $\oplus$ denotes exclusive OR and % denotes a modulo operation, respectively.

That is, the ASC is determined by exclusive OR operation of the ASN and the remainder obtained by dividing the start offset by 2. Such an ASC decision method is to control antenna switching by using the time offset information even without an indication for distinguishing between antennas.

For instance, in FIG. 5, assuming that antenna 1 has a better channel condition than antenna 2, the mobile station sets the ASN to "0" since the odd-slot power is greater than the even-slot power. Moreover, since the time offset $T_{Frame} + T_{Slot}$ between the common channel and the dedicated physical channel approximates to one slot (that is, N=1), the start offset is set to 1. Therefore, ASC=ASN $\oplus$ (offset$_{start}$% 2)=0 $\oplus$ (1% 2)=1. If the ASC is 1, the base station selects antenna 1 to transmit the dedicated physical channel, and if it is 0, the base station selects antenna 2 to transmit the dedicated physical channel. Thus, the ASC is determined by the position of a slot having stronger power, and the remainder (modulo) obtained by dividing an approximate value of the time offset between the common channel and the dedicated physical channel by the number of antennas.

After generating the ASC, the mobile station transmits the reverse dedicated physical channel over which the ASC is included to the base station. The base station then switches the transmission antenna or maintains the same antenna over which the dedicated physical channel is transmitted, according to the ASC.

After transmitting the ASC, the mobile station performs the process of verifying whether the dedicated physical channel is received via the selected antenna. The mobile station checks a specific pilot pattern with respect to all the slots of the dedicated physical channel to determine if it is equal to the ASC at step 729. The mobile station checks whether a probability $P_r$ that the ASC does not equal the ASV is greater than the threshold Thresh$_{Error}$ at step 731. If yes, the mobile station informs the base station so as to be changed to a predetermined (PD) mode for switching the transmission antenna according to a fixed pattern at step 733. If the probability Pr is not greater than the threshold Thresh$_{Error}$, the procedure returns to step 719 to measure the slot power. The diversity transmission method according to the present invention is applicable to a sync system between the base stations except the process of considering the time offset.

Consequently, in the asynchronous mobile communication system between base stations, when the base station transmits a channel via a plurality of antennas, there is no need to use different codes according to the antennas. Therefore, limited codes are efficiently used. Further, since the common channel is transmitted through periodic antenna switching, power consumption can be saved as compared with the consecutive transmission of all the antennas, and the capacity of the base station can be increased.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A channel communication method for a mobile communication system using transmission antenna diversity, comprising the steps of:

alternatively transmitting, at a base station, signals on a common channel via at least two antennas at first and second intervals;

estimating, at a mobile station, a time relationship between the alternatively switched common channel and a user channel;

measuring, at a mobile station, the power of the received signals corresponding to said first and second intervals;

selecting, at said mobile station, an antenna having stronger power by comparing the power of the signal corresponding to said first interval with the power of the signal corresponding to said second interval, and informing the base station of the selected antenna; and transmitting, at said base station, a dedicated channel via said selected antenna.

2. The method as claimed in claim 1, wherein said common channel is a perch channel.

3. The method as claimed in claim 2, wherein said perch channel includes a search code for time synchronization.

4. The method as claimed in claim 1, wherein said dedicated channel is a dedicated physical channel.

5. The method as claimed in claim 1, wherein a time offset exists between said common channel and said dedicated channel.

6. The method as claimed in claim 5, wherein said time offset is the sum of an offset of a slot unit and an offset of a symbol unit.

7. The method as claimed in claim 1, wherein said step of selecting the antenna comprising the steps of:

checking a slot number of said common channel overlapped with said dedicated channel;

measuring power and comparing the power at said first interval corresponding to odd slots with the power at said second interval corresponding to even slots;

setting an antenna selection number to "0" when the power at said first interval is greater than the power at said second interval, and setting said antenna selection number to "1" when the power at said second interval is greater than the power at said first interval; and determining an antenna switching command by an exclusive OR operation of said antenna selection number and a remainder obtained by dividing said slot number by the number of antennas.

8. The method as claimed in claim 7, wherein said antenna switching command is inserted into a specific position of a reverse dedicated channel.

9. The method as claimed in claim 1, further comprising the steps of:

verifying, by a pilot pattern of said dedicated channel, whether said dedicated channel is transmitted via an antenna selected by said mobile station; and transmitting to said base station a mode change command for requesting to switch the antenna to a predetermined pattern when an error possibility is greater than a threshold.

10. A channel communication method for a base station having at least two antennas in a mobile communication system using transmission antenna diversity, comprising the steps of:
   alternatively transmitting data on a forward common channel via at least two antennas at first and second intervals; and
   transmitting data on a forward dedicated channel via an antenna selected by an antenna switching command transmitted from a mobile station.

11. The method as claimed in claim 10, wherein said common channel is a perch channel.

12. The method as claimed in claim 10, wherein said dedicated channel is a dedicated physical channel.

13. The method as claimed in claim 10, wherein a time offset exists between said common channel and said dedicated channel.

14. The method as claimed in claim 10, wherein said antenna switching command is inserted into a specific position of a reverse dedicated channel.

15. A method for selecting, at a mobile station, a transmission antenna of a base station in a mobile communication system using transmission antenna diversity, said method comprising the steps of:
   checking a slot number of a forward common channel overlapped with a forward dedicated channel;
   measuring power and comparing the power at a first interval corresponding to odd slots with the power at a second interval corresponding to even slots;
   setting an antenna selection number to "0" when the power at said first interval is greater than the power at said second interval, and setting said antenna selection number to "1" when the power at said second interval is greater than the power at said first interval; and
   determining an antenna switching command by an exclusive OR operation of said antenna selection number and a remainder obtained by dividing said slot number by the number of antennas, transmitting said determined antenna switching command on a reverse dedicated channel to said base station.

16. The method as claimed in claim 15, wherein said common channel is a perch channel.

17. The method as claimed in claim 15, wherein said dedicated channel is a dedicated physical channel.

18. A base station device having at least two antennas in a mobile communication system using transmission antenna diversity, comprising:
   a common channel transmitter for alternatively transmitting data on a forward common channel via at least two antennas at first and second intervals; and
   a dedicated channel transmitter for transmitting data on a forward dedicated channel via an antenna selected by an antenna switching command received from a mobile station.

19. The base station device as claimed in claim 18, wherein said common channel is a perch channel.

20. The base station device as claimed in claim 19, wherein said perch channel includes a search code for time synchronization.

21. The base station device as claimed in claim 18, wherein said dedicated channel is a dedicated physical channel.

22. The base station device as claimed in claim 18, wherein a time offset exists between said common channel and said dedicated channel.

23. The base station device as claimed in claim 18, wherein said antenna switching command is inserted into a specific position of a reverse dedicated channel.

24. A channel communication device for a mobile communication system using transmission antenna diversity, comprising:
   a base station having at least two antennas, for alternatively transmitting data on a forward common channel via at least two antennas at first and second intervals, and transmitting data on a forward dedicated channel via an antenna selected by an antenna switching command received from a mobile station; and
   a mobile station for receiving data via said forward common channel, measuring the power of the received data corresponding respectively to said first and second intervals, and transmitting said antenna switching command to said base station for selecting an antenna with a better channel condition among said at least two antennas.

25. The channel communication device as claimed in claim 24, wherein said common channel is a perch channel.

26. The channel communication device as claimed in claim 25, wherein said perch channel includes a search code for time synchronization.

27. The channel communication device as claimed in claim 24, wherein said dedicated channel is a dedicated physical channel.

28. The channel communication device as claimed in claim 24, wherein a time offset exists between said common channel and said dedicated channel.

29. The channel communication device as claimed in claim 24, wherein said antenna switching command is inserted into a specific position of a reverse dedicated channel.

* * * * *